Aug. 10, 1926.
A. J. GRINDLE
1,595,151
CONVEYER FIRING SYSTEM FOR PULVERIZED FUEL
Filed Oct. 25, 1924   5 Sheets-Sheet 1
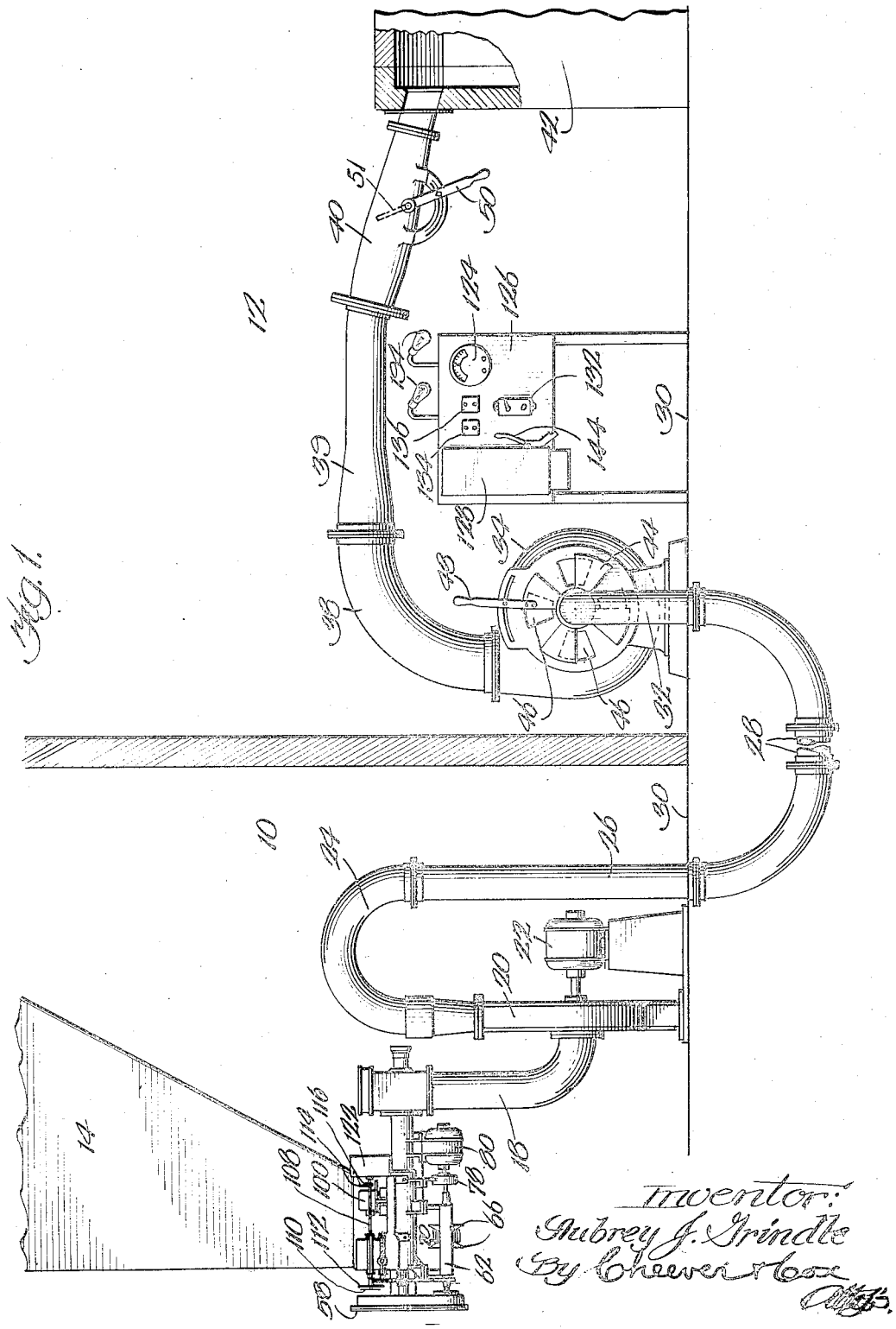

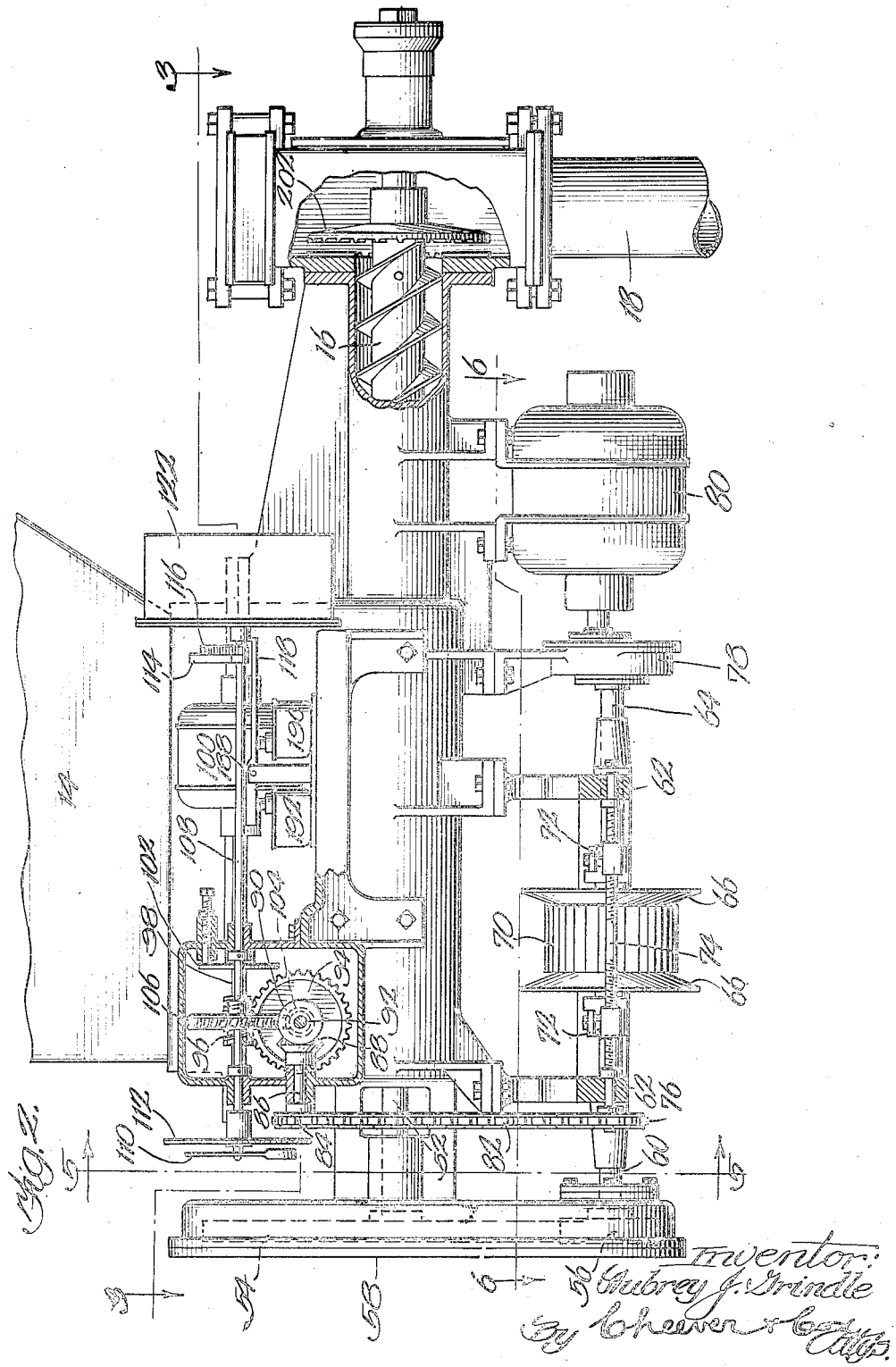

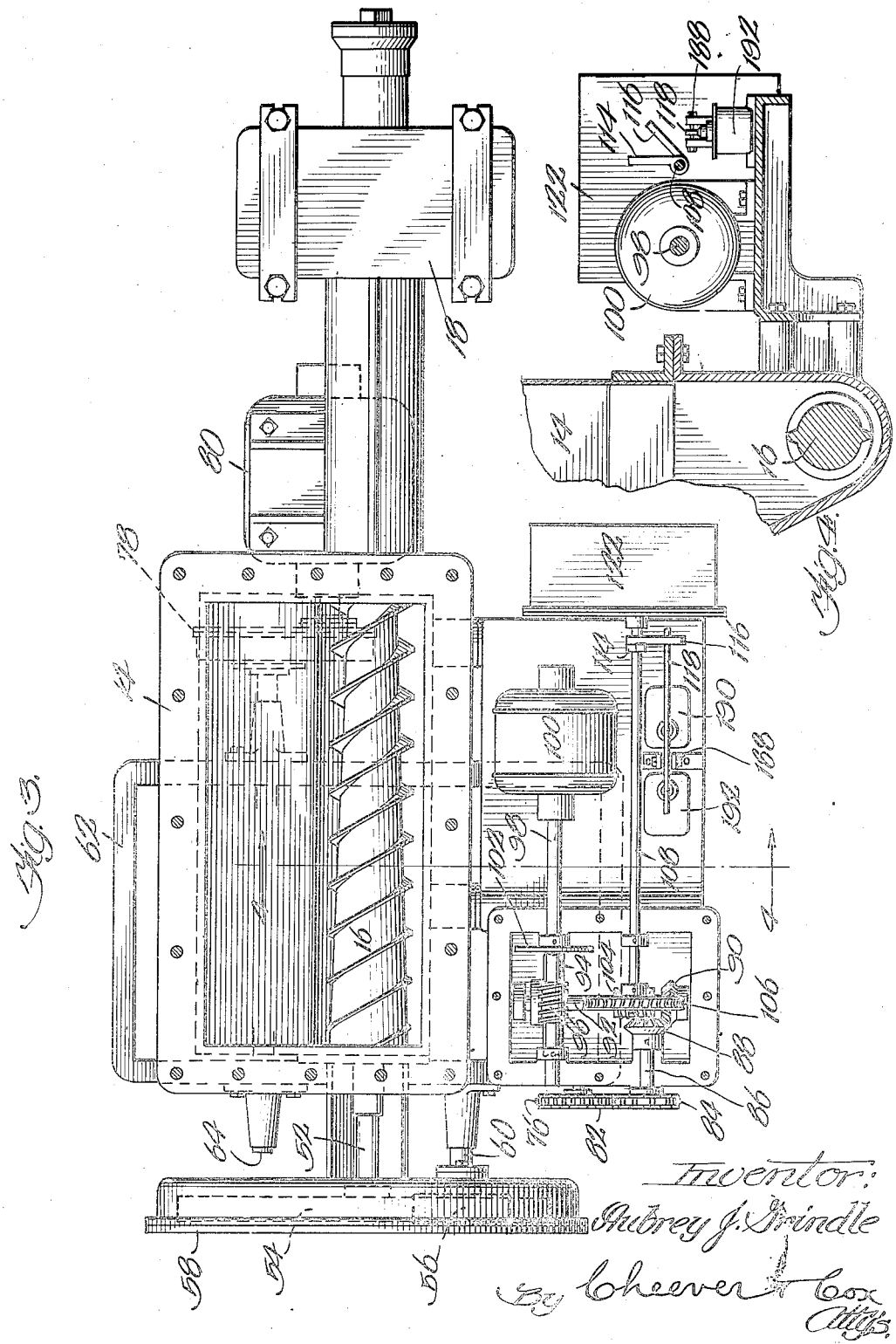

Aug. 10, 1926. 1,595,151
A. J. GRINDLE
CONVEYER FIRING SYSTEM FOR PULVERIZED FUEL
Filed Oct. 25, 1924 5 Sheets-Sheet 4

Inventor:
Aubrey J. Grindle
By Cheever & Cox
Attys.

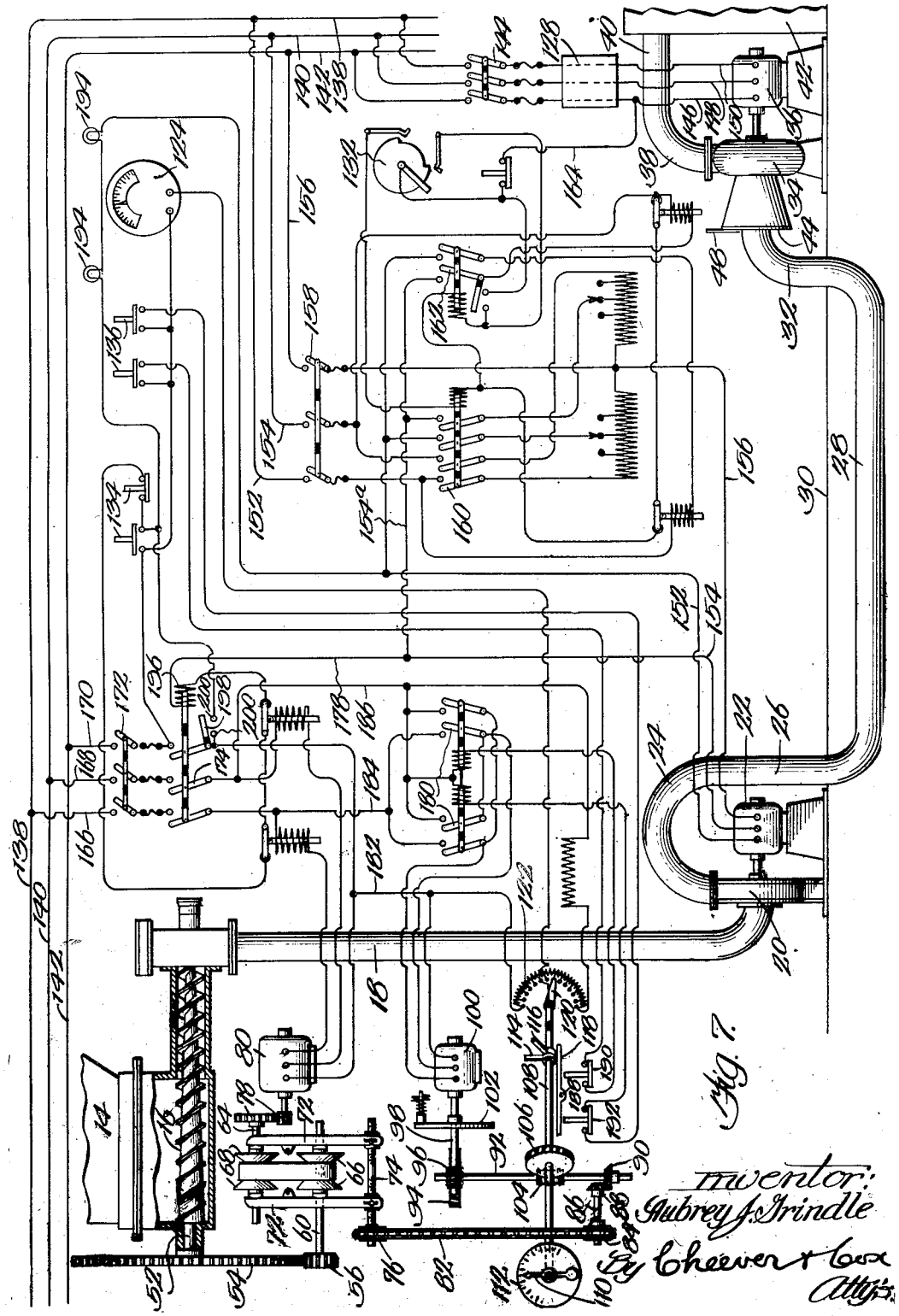

Patented Aug. 10, 1926.

1,595,151

UNITED STATES PATENT OFFICE.

AUBREY J. GRINDLE, OF CHICAGO, ILLINOIS, ASSIGNOR TO GRINDLE FUEL EQUIPMENT COMPANY, OF HARVEY, ILLINOIS, A CORPORATION OF ILLINOIS.

CONVEYER FIRING SYSTEM FOR PULVERIZED FUEL.

Application filed October 25, 1924. Serial No. 745,743.

This invention relates to mechanism for feeding prepared powdered material from one point to another very remote point, using air under pressure as the suspending and transmitting medium. Particularly, the invention is designed for transmitting powdered coal from a receptacle a long distance, say five hundred to one thousand feet, from a fuel supply to the furnace where it is to be consumed and there delivering it into the furnace in condition, viz: in suspension with a sufficient quantity of air, for burning consumption.

The object of the invention is to provide means by which, for economy sake, a given quantity of air under pressure carries a much heavier load of powdered coal than it is capable of burning from a remote storage receptacle to a point adjacent to the furnace, where sufficient air for burning consumption of the coal is added and introduced with the coal into the furnace.

The invention consists in mechanism for attaining the foregoing and other objects; which can be easily and comparatively cheaply made; which is satisfactory in use and is not readily liable to get out of order. More particularly the invention consists in the use of a blower adjacent to the source of powdered coal material for driving the air carrying a dense quantity of powdered coal from the storage receptacle to the furnace and a fan adjacent to the furnace for adding, just before the transmitted coal enters the furnace, a sufficient quantity of air to cause proper burning of the coal in the furnace.

The invention further consists in mechanisms, preferably interlocking one with the other, by which the operator at a point adjacent to the furnace starts in succession the air supplying fan adjacent to the furnace; the coal driving fan adjacent to the coal supply; the motor driving the feeder delivering the coal into the fan which is adjacent to the coal supply, and, finally, a motor regulating the speed of the coal delivery mechanism. thereby regulating the amount of coal delivered to said fan adjacent to the coal supply mechanism.

The invention further consists in numerous features and details of construction hereafter more fully set forth in the specification and claims.

Referring to the drawings in which like numerals designate the same parts throughout the several views: the electrical features being eliminated from Figures 1 to 6 inclusive:

Figure 1 is a side elevation showing the external appearance of mechanism illustrating this invention in its preferred form.

Figure 2 is an enlarged, detail view, certain parts being in section, illustrating the mechanisms immediately adjacent to the source of fuel supply.

Figure 3 is a plan view on the irregular line 3—3 of Figure 2.

Figure 4 is an end elevation, on the line 4—4 of Figure 3.

Figure 7 is a diagrammatic view of the entire mechanism, including the electrical circuits for controlling the entire mechanism.

Figure 5:
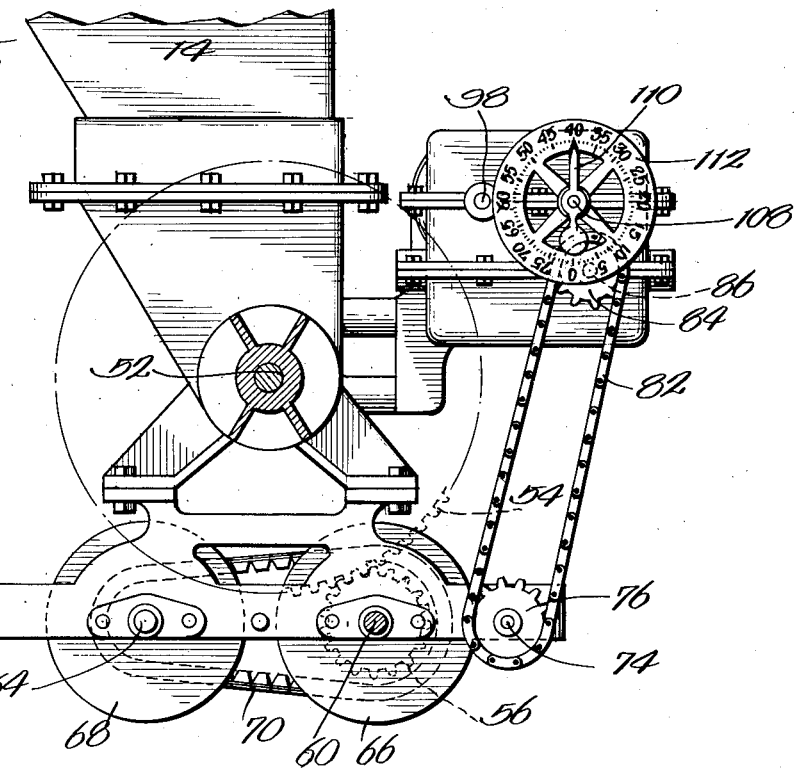
Figure 5 is an end detail view on the line 5—5 of Figure 2.

Figure 1 shows diagrammatically a coal supply room 10 and furnace room 12 located any indefinite distance from the first room, usually several hundred feet. In the supply room is located a powdered coal receptacle 14 of any convenient capacity, kept continuously supplied with coal by any suitable means from any suitable source not entering into this invention and therefore not shown. The receptacle 14 is preferably a downwardly tapered hopper including at its bottom a coal feeding screw 16 adapted when rotated, as hereafter described, to deliver successive small quantities of coal into the top of the vertical supply pipe 18 of a conventional fan 20. The fan is driven by any suitable source of power as, for instance, the motor 22 and is adapted as set forth in the opening statement to drive air heavily laden with powdered coal material through pipe sections 24, 26, and thence through a long conveyer pipe 28, located in the particular case here illustrated under the floor 30. Pipe section 28 terminates in room 12 at the intake pipe 32 of supplemental air supply fan 34 driven by motor 36. Fan 34 adds to the coal laden air delivered through pipe section 28 from fan 20 sufficient air for burning combustion of the coal and delivers the thus aerated coal through pipe sections 38—39 and 40 into the furnace 42 where the fuel material is to be consumed. The air delivered by the fan 34 is controlled by a conventional form of valve device 44 operating over side ports 46 and manually manipulatable by a handle 48. Further control of the velocity of the fuel material entering the furnace may be effected by operating a hand lever 50 to control a conventional valve 51 not shown in detail in pipe 40.

Figure 6:
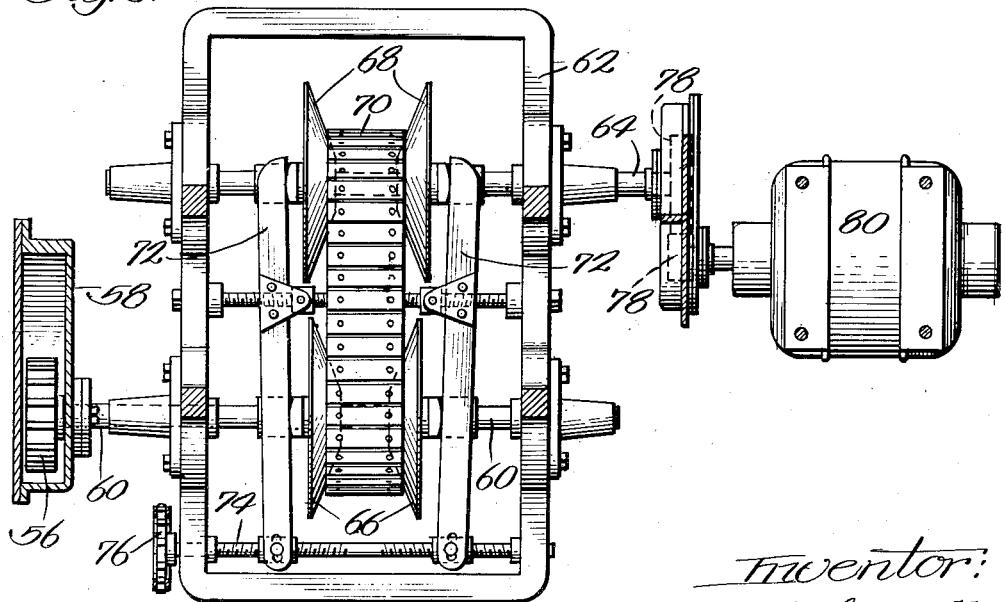
Figure 6 is a plan view on the line 6—6 of Figure 2.

The coal feed screw 16 is rigidly attached at its left hand end, as viewed in Figures 2 and 3, through shaft 52 to a large gear 54 meshing with a pinion 56 enclosed with said gear 54 in a suitable protective housing 58. Gear 56 is carried by a shaft 60 extending through and journaled in the frame 62, containing a speed varying mechanism—that shown in Figure 6 being what is known in the trade as a Reeve's variable speed drive. This mechanism for varying the fuel delivered to pipe 18 in proportion to the burning requirements includes a shaft 64 parallel to shaft 60, variably spaceable cone pulleys 66 on shaft 60, corresponding pulleys 68 on shaft 64, a belt 70 traveling on the pulleys, and cone regulating levers 72 controllable by screw 74 and sprocket wheel 76. The mechanism is adapted to in a conventional manner, well known in the art, vary the effective diameters of the pulleys 66 and 68 under the belt 70 and thus vary the speed of shaft 60 and, consequently, of feed screw 16, transmitted to it by shaft 64, which is, itself, driven through gearing 78 from any suitable source of power, as, for instance, motor 80. Varying the speed of screw 16 obviously varies the amount of fuel carried by it. Power mechanism for selectively rotating sprocket wheel 76 in either direction as desired is transmitted to the sprocket wheel through an embracing chain 82 which is, itself, driven from another sprocket wheel 84 on a shaft 86 carrying a bevel gear 88 meshing with a gear 90 on a shaft 92. This last shaft carries a worm gear 94 meshing with a worm 96 on a shaft 98 driven by any suitable source of power as, for instance, motor 100. Shaft 98 is equipped with a conventional brake 102 preventing the shaft and motor from spinning when the power is cut off from the motor thereby accurately stopping regulation of the fuel the instant the power is cut off. When motor 100 rotates in one direction it through the mechanism described rotates sprocket wheel 76 to manipulate the speed varying mechanism in frame 62 to increase the speed of rotation of coal feed screw 16. By causing the motor 100 to rotate in the opposite direction, the speed of the screw will be varied in the opposite direction. Each of these operations takes place as long as the motor 100 continues to rotate so prompt stopping of the regulating device and motor when the power is shut off is important.

Indicating mechanism is provided for graphically showing the speed of the screw 16 by equipping shaft 92 with a worm 104 meshing with the worm wheel 106 on a shaft 108. This latter shaft carries a pointer or hand 110 traversing graduated dial 112. The numerical graduations shown on this dial in Figure 5 have no special significance. In Figure 5, the hand is at 40 about opposite zero which indicates that screw 16 is traveling at approximately its middle speed for the delivery of coal. The shaft 108 carries a conventional form of limit switch, having high speed arm 114 and low speed arm 116, respectively engageable with pivoted switch lever 118 when the coal screw 16 reaches maximum or minimum speed, as the case may be, to stop motor 100 and thus leave the screw 16 rotating at the maximum or minimum speed, as the case may be, and thus prevent damage to the variable speed mechanism in frame 62. Shaft 108 also carries a rheostat lever 120 traversing the conventional points of a rheostat 122 connected in circuit hereafter described with a volt meter 124 located on the switch board 126 in room 12 adjacent to furnace 42. The volt meter 124 is provided with graduations corresponding to the graduations on dial 112 adjacent to the coal feeding apparatus and the resistance of the rheostat 122 is such that the volt meter pointer will move over the volt meter dial substantially as pointer 110 moves over dial 112. In other words, it is possible for the operator in room 12 to tell as accurately what the speed of the feed screw 116 is as is possible for the operator in room 10 observing dial 112. Motor 36 for fan 34 is controlled by a conventional form of starting box 128 and switch 144 therefor, located on switch board 126. Switch board 126 also carries a starting switch 132 controlling motor 22, a starting switch 134 controlling motor 80, and a starting switch 136 for motor 100.

In order to prevent coal with insufficient air for burning purposes being sent by fan 20 into furnace 42; in order to prevent the feed screw 16 from operating when fan 20 is not operating to carry away coal delivered by it; and in order to prevent the speed changing mechanism from operating when the feed screw 16 is not running, each of which misoperations might produce more or less serious results, the starting mechanisms referred to are so electrically interlocked that in the first instance the operator can only start motor 36 and consequently fan 34; that he can then only start motor 22 and consequently fan 20; he can then only start motor 80 and consequently the screw 16; and that he must lastly start the speed varying motor 100. These are also so interlocked in order that if any motor through accident or otherwise fails to operate, all motors beyond it in the starting operation set forth in the last sentence will automatically stop, thereby preventing damage through misoperation of the device. This interlocking result is effected by the use of the wiring diagram substantially shown in Figure 7 in which wires 138, 140 and 142 are line wires supplied with electrical energy from a point to the left of Figure 7, not entering into this invention and therefore not shown. Motor 36 is supplied from these line wires through a conventional disconnecting switch 144, starting box 128 and branch wires 146, 148 and 150, all in a conventional manner.

Motor 22, driving fan 20, receives its electric energy from wires 138—142, through branch wires 152—154—156 leading through disconnecting switch 158, and conventional starting mechanisms 160 and 162.

The conventional starting mechanisms 160 and 162 are energized and set in operation for starting the motor by having current sent through them which is controlled by conventional starting switch 132. The current controlled by this starting switch 132 is received via a wire 164 attached to wire 146 which is only energized and supplied with current when motor 36 is in operation; therefore, it is impossible to operate starting switch 132 to operate motor 22 until motor 36 is operated. The current which switch 132 derives from wire 146 ultimately gets back to wire 154.

In like manner, motor 80 acquired its electric energy from wires 138—140—142 through wires 166—168 and 170, traversing disconnecting switch 172 and conventional starting mechanism 174 operated in conventional manner by electric current furnished to it through switch 134 heretofore referred to. The current supplied to and controlled by switch 134 is derived through wires 154ª and 178 which are directly connected to starter mechanism 162 of motor 22 and only receive current when motor 22 is in operation, the result being that switch 134 can be manipulated to the operator's fullest desire without in any way starting motor 80 until such time as motor 22 is in operation. The current from switch 134 ultimately returns to wire 170.

Motor 100 is interlocked to motor 80 in a slightly different manner in that the starting mechanism 180 takes its current in the first instance through wires 182—184 and 186 directly from the wiring of motor 80 with the result that no current will be supplied to motor 100 until switch 174 is operatively closed to thereby start motor 80. Switch 136 in this instance merely controls in conventional manner the starting mechanism 180. Obviously if no current is available through switch 174, as just described, operation of switch 136 is futile and therefore motor 100 can not be started except when motor 80 is in operation.

Lever 118 when tilted in a clockwise direction on its pivot 188 by limit switch 114—116 opens a switch 190 conventionally connected to one of the coils of starting mechanism 180 to thereby cut off the current to motor 100 and stop it. In similar manner, when lever 118 rocks in the opposite direction, it opens the switch 192 correspondingly connected to the other coil of the starting mechanism 180 and conventionally adapted to cut off the current operating motor 100 to stop it. The detailed method of this operation is as follows:—Consider lever 118 placed in front of shaft 108, Figure 1. When shaft 108 revolves in a counter-clockwise direction, lever 114 will, after traveling about 230° from the position shown in Fig. 1, strike lever 118 from the bottom, rotating the same in counter-lockwise direction, thus opening switch 192. Likewise, when shaft 108 is revolved in the opposite or a clockwise direction, lever 116 will strike lever 118 from the top causing same to rotate in clockwise direction, opening switch 190. These are stopping switches only and neither switch is opened except when the device is to be stopped.

The switchboard 126 is provided with a pair of indicating lamps 194, connected in circuit as shown in Figure 7 in such manner that when motor 22 starts, current is delivered to them through wires 152 and 154ª and coil 196 in the starting mechanism of motor 80, with the result that the lamps burn dimly thus indicating to the observer at the switchboard that motor 22 alone has started. The circuit of these lamps 194 is, however, such that when motor 80 starts, thereby closing switch bar 198 against contacts 200, this coil 196 is cut out and current passes directly from wire 152 to wire 170 through these lamps thus causing them to burn brightly and indicate to the operator at the switchboard that both motors 22 and 80 are running. This matter may be more fully explained in detail as follows: Current coming from line 152 passes through lamps 194 then through right hand switch 134, through solenoid 196 returning to line 154 completing circuit. While this current passes through solenoid, it is not sufficient to operate switch,—this due to small amount of current which can pass through lamps 194. The impedance of the solenoid 196 added to resistance of lamps 194 is sufficient to cause the dimming of the lamps.

In order to make the use of wire 154ª entirely clear, it may be stated that if we start at line 152 at the top of switch 158, this circuit will trace downward to top of switch 160, which is open, thence to the left, then down to solenoid, thence through solenoid through line leading to the right, thence upward to right-hand blade of switch 162, thence upward and to left to line 152 leading from motor 22 to lamps 194. From lamps 194, the circuit traces through coil 196 as described in the last paragraph. From coil 196, the circuit continues downward to line 154 leading to motor 22 but as this circuit has not yet returned to a line circuit, it should be noted that about midway between 196 and motor 22 line 154ª leads to the right through which the current must follow to left hand blade of switch 162, thence downward through a solenoid and immediately returning upward again and to the left to bottom of switch 158, and thence through this switch to line 154.

When left-hand switch 134 is pressed, current is supplied from line 170 through switch 172, thence through right-hand switch 134, through solenoid 196 returning to line 154 and completing the circuit—this without the lamps 194 in series, and this provides enough current in solenoid 196 to operate the switch 174. When the switch 174 operates, switch 200 is closed by this movement so that the first described current passing from line 152 is passed through switch 200 to line 170 which is the same polarity as line 154 to which it formerly returned, thus causing current to pass through lamps 194 without passing through solenoid 196 and this allows the lamps to burn with normal brightness.

The coal fed to the right, as viewed in the figures, by screw 16 drops into pipe 18 behind a toothed wheel 202 of conventional form not here entering directly into the invention.

In actual operation, the fan 20 operates at from eight to sixteen ounces pressure and the fan 34 at from three to six ounces pressure.

Having thus described my invention, what I claim as new and desire to secure by Letters Patent is:

1. In a device of the class described, in combination a source of powdered fuel, a furnace remote therefrom, a passage connecting them, a power driven fan adjacent the source for forcing air laden with powdered material from said passage to the furnace, another power driven fan adjacent the furnace supplying additional air to the powdered fuel driven along said passage by the first fan, and means at the furnace for starting each of the driving mechanisms interlocked so that the one at the source will operate only when the one at the furnace is operating.

2. In a device of the class described, in combination a source of powdered fuel, a furnace remote therefrom, a passage connecting them, a power driven propelling mechanism adjacent the source for forcing air laden with powdered material from said source through said passage to the furnace, power driven propelling mechanism adjacent the furnace supplying additional air to the powdered fuel driven along said passage by the first power driven propelling mechanism, and means at the furnace for starting each of the driving mechanisms interlocked so that the one at the source will operate only when the one at the furnace is operating.

3. In a device of the class described, in combination a source of powdered fuel, a furnace remote therefrom, a passage connecting them, power driven means for feeding quantities of powdered fuel from said source into said passage, a power driven fan adjacent the source for forcing air laden with said powdered material from said source through said passage to the furnace, another power driven fan adjacent the furnace supplying additional air to the powdered fuel driven along said passage by the first fan, means at the furnace for starting each of the driving mechanisms interlocked so that the one at the source will operate only when the one at the furnace is operating, and the one driving the feeding mechanism will operate only when the propelling means at the source is operating.

4. In a device of the class described, in combination a source of powdered fuel, a furnace remote therefrom, a passage connecting them, power driven means for feeding quantities of powdered fuel from said source into said passage, a power driven propelling mechanism adjacent the source for forcing air laden with said powdered material from said source through said passage to the furnace, power driven propelling mechanism adjacent the furnace supplying additional air to the powdered fuel driven along said passage by the first power driven propelling mechanism, means at the furnace for starting each of the driving mechanisms interlocked so that the one at the source will operate only when the one at the furnace is operating, and the one driving the feeding mechanism will operate only when the propelling means at the source is operating.

5. In a device of the class described, in combination, a source of powdered fuel, a furnace remote therefrom, a passage connecting them, power driven means for feeding quantities of powdered fuel from said source into said passage, power driven means for regulating the speed of said feeding means and consequently the amount of fuel delivered from said source, a power driven fan adjacent the source for forcing air laden with powdered material from said source through said passage to the furnace, another power driven fan adjacent the furnace supplying additional air to the powdered fuel driven along said passage by the first fan, means at the furnace for starting each of the driving mechanisms interlocked so that the one at the source will operate only when the one at the furnace is operating, and the one driving the feeding mechanism will operate only when the propelling means at the source is operating, and the power driven mechanism for operating the speed regulator can operate only when the feeding mechanism is operating.

6. In a device of the class described, in combination a source of powdered fuel, a furnace remote therefrom, a passage connecting them, power driven means for feeding quantities of powdered fuel from said source into said passage, power driven means for regulating the speed of said feeding means and consequently the amount of fuel delivered from said source, a power driven propelling mechanism adjacent the source for forcing air laden with said powdered material from said source through said passage to the furnace, power driven propelling mechanism adjacent the furnace supplying additional air to the powdered fuel driven along said passage by the first power driven propelling mechanism, means at the furnace for starting each of the driving mechanisms interlocked so that the one at the source will operate only when the one at the furnace is operating, the one driving the feeding mechanism will operate only when the propelling means at the source is operating, and the power driven mechanism for operating the speed regulator can operate only when the feeding mechanism is operating.

7. In a device of the class described, in combination a source of powdered fuel, a furnace remote therefrom, a passage connecting them, power driven means for feeding quantities of powdered fuel from said source into said passage, power driven means for regulating the speed of said feeding means and consequently the amount of fuel delivered from said source, a power driven fan adjacent the source for forcing air laden with said powdered material from said source through said passage to the furnace, another power driven fan adjacent the furnace supplying additional air to the powdered fuel driven along said passage by the first fan, and automatic means shutting off the power for regulating the speed when the feeding means reaches maximum and minimum speeds.

8. In a device of the class described, in combination, a source of powdered fuel, a furnace remote therefrom, a passage connecting them, power driven means for feeding quantities of powdered fuel from said source into said passage, power driven means for regulating the speed of said feeding means and consequently the amount of fuel delivered from said source, a power driven propelling mechanism adjacent the source for forcing air laden with said powdered material from said source through said passage to the furnace, power driven propelling mechanism adjacent the furnace supplying additional air to the powdered fuel driven along said passage by the first power driven propelling mechanism, and automatic means shutting off the power for regulating the speed when the feeding means reaches maximum and minimum speeds.

9. In a device of the class described, in combination, a source of powdered fuel, a furnace remote therefrom, a passage connecting them, power driven means for feeding quantities of powdered fuel from said source into said passage, power driven means for regulating the speed of said feeding means and consequently the amount of fuel delivered from said source, a power driven fan adjacent the source for forcing air laden with said powdered material from said source through said passage to the furnace, and another power driven fan adjacent the furnace supplying additional air to the powdered fuel driven along said passage by the first fan, and a signal at the furnace indicating initially the operating of the propelling fan at the source and finally the continued operation of the feeding mechanism.

10. In a device of the class described, in combination, a source of powdered fuel, a furnace remote therefrom, a passage connecting them, power driven means for feeding quantities of powdered fuel from said source into said passage, power driven means for regulating the speed of said feeding means and consequently the amount of fuel delivered from said source, a power driven propelling mechanism adjacent the source for forcing air laden with said powdered material from said source through said passage to the furnace, power driven propelling mechanism adjacent the furnace supplying additional air to the powdered fuel driven along said passage by the first power driven propelling mechanism, and a signal at the furnace indicating initially the operating of the propelling mechanism at the source and finally the continued operation of the feeding mechanism.

In witness whereof, I have hereunto subscribed my name.

AUBREY J. GRINDLE.